(12) United States Patent
Peng

(10) Patent No.: US 9,168,633 B2
(45) Date of Patent: Oct. 27, 2015

(54) MILLING AND GRINDING DEVICE AND MACHINING METHOD USING THE SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Song-Tao Peng, Shenzhen (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/155,501

(22) Filed: Jan. 15, 2014

(65) Prior Publication Data

US 2014/0206258 A1    Jul. 24, 2014

(30) Foreign Application Priority Data

Jan. 19, 2013    (CN) .......................... 2013 1 0019029

(51) Int. Cl.
| | |
|---|---|
| B24B 51/00 | (2006.01) |
| B23P 23/02 | (2006.01) |
| B23Q 17/20 | (2006.01) |
| B24B 49/02 | (2006.01) |
| B24B 5/08 | (2006.01) |

(52) U.S. Cl.
CPC ................. *B24B 51/00* (2013.01); *B23P 23/02* (2013.01); *B23Q 17/20* (2013.01); *B24B 5/08* (2013.01); *B24B 49/02* (2013.01)

(58) Field of Classification Search
CPC ............ B24B 5/05; B24B 5/10; B24B 49/02; B24B 51/00; B24B 53/04; B23Q 5/32; B23Q 17/20; B23C 1/06; B23P 23/02

USPC ......... 451/5, 8, 10, 11, 21, 51, 54, 55, 56, 57, 451/58, 61, 69, 70, 71, 72, 73, 178, 443
See application file for complete search history.

(56) References Cited

U.S. PATENT DOCUMENTS

| | | | | |
|---|---|---|---|---|
| 3,924,355 | A | * | 12/1975 | Tatsumi et al. .................. 451/65 |
| 4,265,054 | A | * | 5/1981 | Ito .................................. 451/72 |
| 4,704,825 | A | * | 11/1987 | Moore .............................. 451/5 |
| 5,044,125 | A | * | 9/1991 | Lambert et al. ................. 451/27 |
| 5,384,983 | A | * | 1/1995 | Siggelin .......................... 451/65 |
| 5,651,720 | A | * | 7/1997 | Shinomoto et al. ............... 451/8 |
| 8,210,907 | B2 | * | 7/2012 | Walter et al. .................... 451/61 |
| 2010/0062692 | A1 | * | 3/2010 | Tomita et al. ................... 451/61 |

FOREIGN PATENT DOCUMENTS

| | | |
|---|---|---|
| TW | 261031 | 10/1995 |
| TW | M373247 U1 | 2/2010 |

* cited by examiner

*Primary Examiner* — Timothy V Eley
(74) *Attorney, Agent, or Firm* — Novak Druce Connolly Bove + Quigg LLP

(57) ABSTRACT

A milling and grinding device, for machining a workpiece, includes a rack, a positioning tool, a spindle, a tool magazine, a milling cutter, a grinding wheel, and a controller. The rack defines a receiving chamber, and includes a workstation at a bottom of the receiving chamber. The positioning tool is mounted on the workstation to position the workpiece. The milling cutter and the grinding wheel are received in the tool magazine. The milling cutter is capable of milling the workpiece to form a hole. The grinding wheel is capable of grinding the hole of the workpiece. The controller is mounted on the rack, and capable of controlling the spindle to receive the milling cutter or the grinding wheel from the tool magazine, to mill or grind the workpiece. The tool setting gauge is mounted on the workstation, and capable of sharpening the grinding wheel in a different grinding precision.

12 Claims, 5 Drawing Sheets

MILLING AND GRINDING DEVICE AND MACHINING METHOD USING THE SAME

BACKGROUND

1. Technical Field

The present disclosure relates to milling and grinding devices, particularly to a milling and grinding device to machine a hole in a workpiece and a machining method using the milling and grinding device.

2. Description of Related Art

When machining a workpiece, an internal grinding machine or a milling machining is used. The grinding machine can machine holes with high precision, but has low efficiency. The milling machining can efficiently machine the inner hole, but accuracy is low.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

Figure 1:
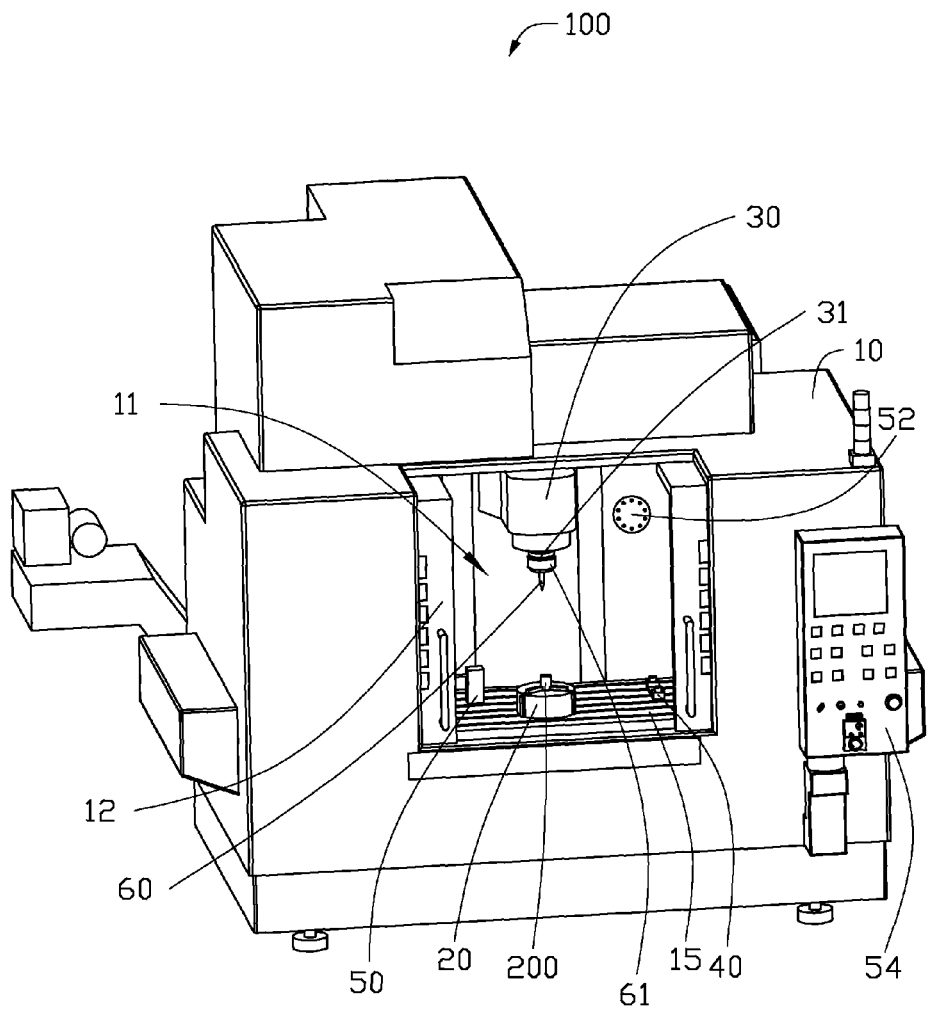
FIG. 1 is an isometric view of an embodiment of a milling and grinding device in a first use state, in which the milling and grinding device comprising a positioning tool.
Figure 2:
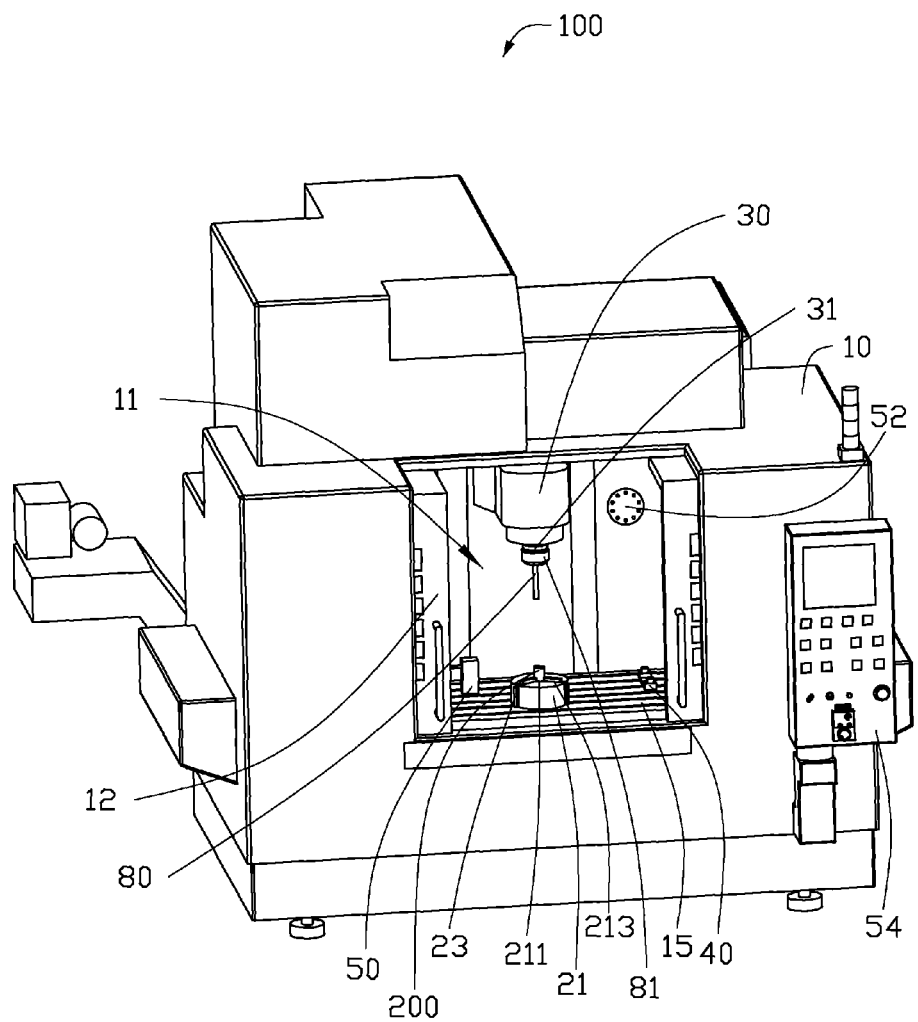
FIG. 2 is an isometric view of the milling and grinding device shown in FIG. 1 in a second use state.
Figure 3:
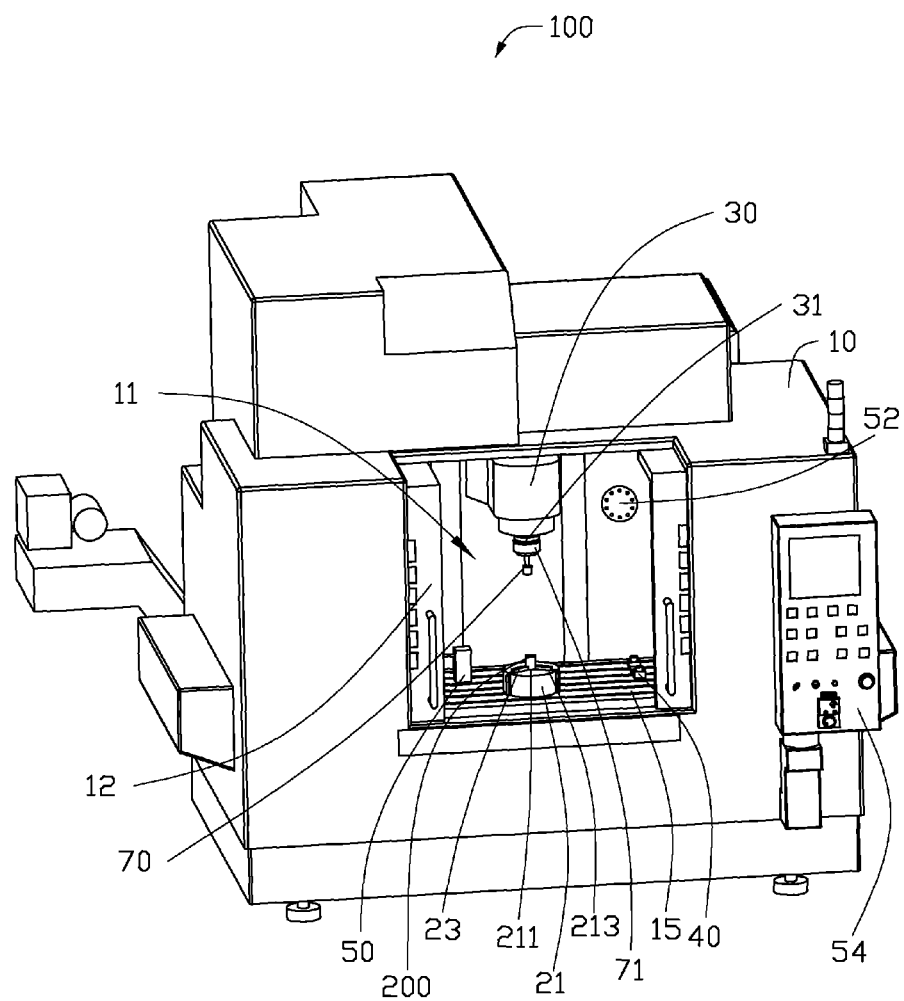
FIG. 3 is an isometric view of the milling and grinding device shown in FIG. 1 in a third use state.

FIGS. 1 to 3 show an embodiment of a milling and grinding device 100. The milling and grinding device 100 includes a rack 10, a positioning tool 20, a spindle 30, a tool setting gauge 40, a tool sharpening mechanism 50, a tool magazine 52, a controller 54, a milling cutter 60 (shown in FIG. 1), a grinding wheel 70 (shown in FIG. 3), and a measuring probe 80 (shown in FIG. 2). The positioning tool 20, the spindle 30, the tool setting gauge 40, the tool sharpening mechanism 50, the tool magazine 52, the controller 54, the milling cutter 60, the grinding wheel 70, and the measuring probe 80 are mounted on the rack 10, respectively.

The positioning tool 20 is configured to position a workpiece 200. The spindle 30 is located above the positioning tool 20, and is configured to fix the milling cutter 60, the grinding wheel 70, and the measuring probe 80. The tool setting gauge 40 is configured to place the milling cutter 60 or the grinding wheel 70 in a predetermined position. The tool sharpening mechanism 50 is configured to sharpen the grinding wheel 70. The tool magazine 52 is configured to store the milling cutter 60, the grinding wheel 70, and the measuring probe 80, so that the spindle 30 can receive the milling cutter 60, or the grinding wheel 70, or the measuring probe 80 stored in the tool magazine 52, respectively, from the tool magazine 52. The controller 54 is configured to control the spindle 30 to drive corresponding tools (i.e. the milling cutter 60, the grinding wheel 70, or the measuring probe 80) to mill, or grind, or measure the workpiece 200. In the illustrated embodiment, the milling and grinding device 100 machines an inner hole 201 on a top surface of the workpiece 200.

The rack 10 is a substantially cubic frame, and defines a receiving chamber 11. A sliding door 12 is mounted on the rack 10, thus the receiving chamber 11 is selectively exposed to outside by opening or closing the sliding door 12. The rack 10 includes a workstation 15 located at a bottom surface of the receiving chamber 11.

Figure 4:
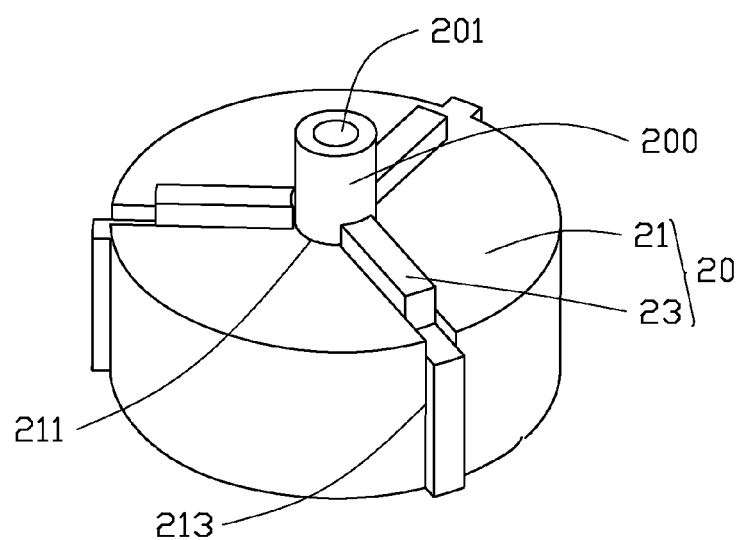
FIG. 4 is an enlarged, isometric view of the positioning tool of the milling and grinding device shown in FIG. 1.

FIG. 4 shows the positioning tool 20. The positioning tool 20 is mounted on the workstation 15, and includes a fixing portion 21, three clamping portions 23, and a driving portion (not shown). The fixing portion 21 is substantially cylindrical, and is mounted on the workstation 15. The fixing portion 21 defines a fixing hole 211 along a center axis thereof, and radially defines three receiving grooves 213. The receiving grooves 213 communicate with the fixing hole 211, and an included angle of adjacent receiving grooves 213 is 120 degrees. The fixing hole 211 is configured to fasten the workpiece 200. The clamping portions 23 are substantially cuboid, and are received in the receiving grooves 213, respectively. The clamping portions 23 are located along a radial direction of the fixing portion 21. The driving portion is positioned on the fixing portion 21, and connected to the clamping portions 23, for driving the clamping portions 23 to move towards or away from the fixing hole 211, thereby permitting or facilitating the clamping portions 23 to cooperatively clamp the workpiece 200 received in the fixing hole 211. In the illustrated embodiment, the positioning tool 20 is a three jaw chuck. The illustrated figures only show a general sketch of the positioning tool 20.

The spindle 30 is substantially cylindrical, and is vertically mounted on a top surface of the rack 10 above the receiving chamber 11 and the positioning tool 20. A mounting portion 31 is formed at a distal end of the spindle 30 facing the positioning tool 20, for mounting of the milling cutter 60, the grinding wheel 70, and the measuring probe 80, respectively, for use in different processes. In the illustrated embodiment, the mounting portion 31 is a pneumatic clamping claw.

The tool setting gauge 40 is mounted on the workstation 15, and located beside the positioning tool 20, for placing the milling cutter 60 or the grinding wheel 70 in a predetermined position. The tool sharpening mechanism 50 is mounted on the workstation 15, and is positioned at side of the positioning tool 20 away from the tool setting gauge 40, and used for sharpening the grinding wheel 70 to achieve different grinding precision. The tool magazine 52 is received in the receiving chamber 11 of the rack 10, for storing the milling cutter 60, the grinding wheel 70, and the measuring probe 80. It is convenient for the spindle 30 to retrieve different tools from the tool magazine 52. The controller 54 is mounted on the rack 10, and is configured to control the spindle 30 to retrieve the milling cutter 60, or the grinding wheel 70, or the measuring probe 80 from the tool magazine 52, and to control the spindle 30 controlling corresponding tools to machine the workpiece 200. The milling cutter 60, the grinding wheel 70, and the measuring probe 80 are stored in the tool magazine 52.

Each of the milling cutter 60, the grinding wheel 70, and the measuring probe 80 includes a positioning portion 61, 71, 81, respectively. The positioning portions 61, 71, 81 are suitable for mounting to the mounting portion 31 of the spindle 30, thereby enabling the milling cutter 60, the grinding wheel 70, and the measuring probe 80 to be mounted to the spindle 30. Each positioning portion 61, 71, 81 defines a mounting hole (not shown) along a longitudinal direction thereof, for engaging with the mounting portion 31 of the spindle 30. In the illustrated embodiment, the positioning portions 61, 71, 81 are the same shape and size.

In the illustrated embodiment, the milling cutter 60 is configured to rapidly mill a pre-formed inner hole on the workpiece 200. The grinding wheel 70 is configured to grind the pre-formed inner hole after milling is completed, thereby achieving (or forming) an inner hole 201 with maximum precision. The measuring probe 80 is configured to measure an inner radius of the inner hole after the workpiece 200 being milled or ground, and the measuring probe 80 feeds back the measuring result to the controller 54. The controller 54 controls a grinding volume or amount of the grinding wheel 70 on the workpiece 200 according to the measured result. The illustrated figures only show a general sketch of the spindle 30, the tool setting gauge 40, the tool sharpening mechanism 50, the tool magazine 52, the milling cutter 60, the grinding wheel 70, and the measuring probe 80.

Figure 5:
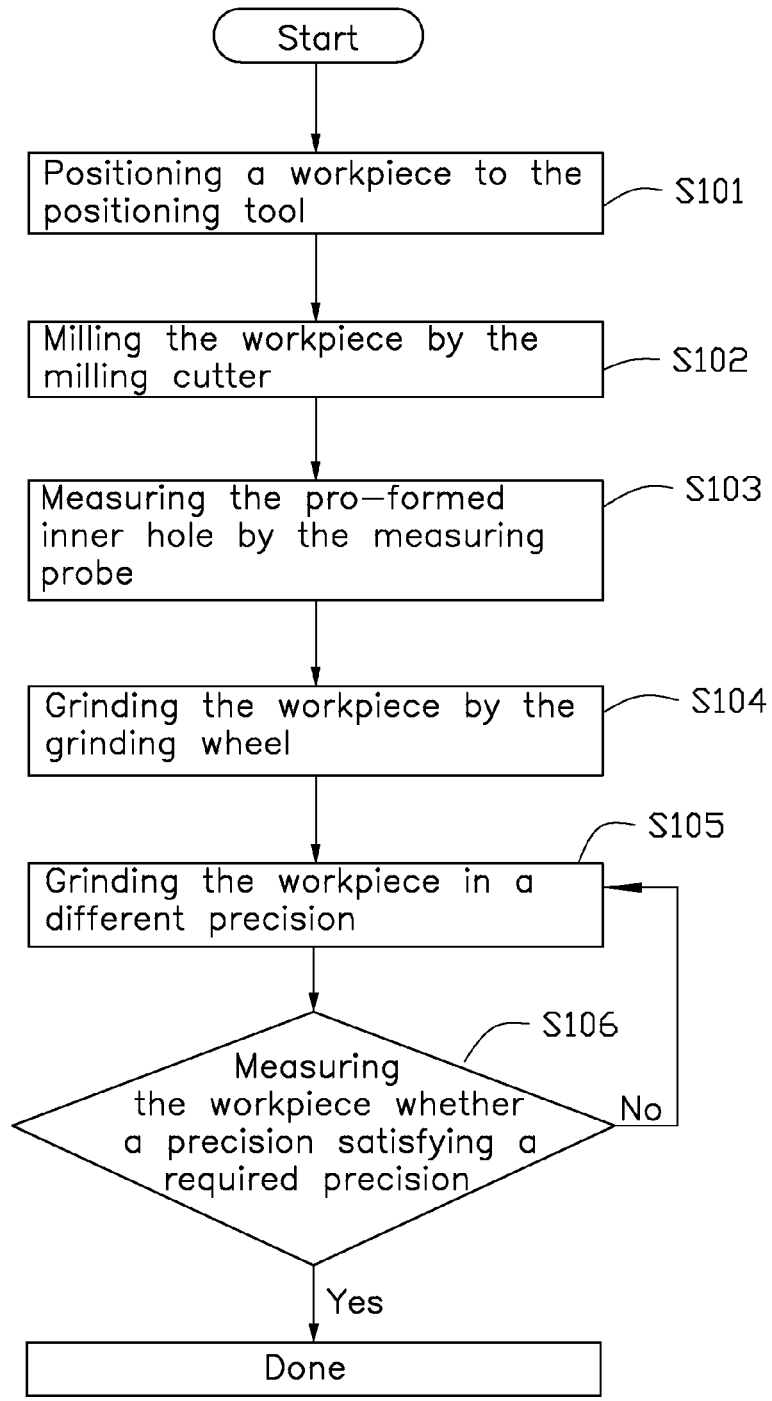
FIG. 5 is a flowchart of an embodiment of a machining method of the milling and grinding device shown in FIG. 1.

FIG. 5 shows an embodiment of a machining method of using the milling and grinding device 100 including following steps.

Step 101: a workpiece 200 in which an inner hole is to be milled is mounted on the fixing hole 201 of the positioning tool 20. The driving portion drives the clamping portions 23 radially, to position the workpiece 200 in the fixing hole 211. In the illustrated embodiment, the workpiece 200 is substantially cylindrical.

Step 102: the milling cutter 60 mills the workpiece 200. The controller 54 controls the spindle 30 to receive the milling cutter 60 from the tool magazine 52, and then the tool setting gauge 40 sets a position of the milling cutter 60, such that the milling cutter 60 is positioned in an accurate position. The spindle 30 drives the milling cutter 60 to rapidly cut a pre-formed inner hole in the workpiece 200. An allowance is reserved when milling the workpiece 200, to allow the grinding wheel 70 to grind the pre-formed inner hole in another process. That is, a size of the pre-formed inner hole is smaller than a size of the needed inner hole of the workpiece 200, and a size difference between the pre-formed inner hole and the needed (finished) inner hole is the allowance. FIG. 1 shows that the milling and grinding device 100 is in a first use state.

Step 103: the measuring probe 80 measures the pre-formed inner hole of the workpiece 200. The controller 54 controls the spindle 30 to replace the milling cutter 60 with the measuring probe 80 from the tool magazine 52, and controls the spindle 30 to drive the measuring probe 80 to insert into the pre-formed inner hole. The measuring probe 80 detects and measures a size of the pre-formed inner hole, and a measuring result is fed back to the controller 54. FIG. 2 shows that the milling and grinding device 100 is in a second use state.

Step 104: the grinding wheel 70 grinds the workpiece 200. The controller 54 controls the spindle 30 to replace the measuring probe 80 with the grinding wheel 70 from the tool magazine 52, and controls the spindle 30 to drive the grinding wheel 70 to grind the pre-formed inner hole. The controller 54 calculates a grinding amount according to the measured result of the measuring probe 80. This grinding process of the pre-formed inner hole is a rough grinding.

Step 105: a different grinding precision relative to the grinding process in Step 104 grinds the workpiece 200 a second time. The controller 54 controls the spindle 30 to drive the grinding wheel 70 to move to the tool sharpening mechanism 50. The tool sharpening mechanism 50 sharpens the grinding wheel 70. After sharpening the grinding wheel 70, the controller 54 controls the spindle 30 to drive the grinding wheel 70 to grind the pre-formed inner hole. This grinding process is a fine grinding. After the fine grinding, the grinding wheel 70 is controlled to be sharpened and to grind the pre-formed inner hole again, and this grinding process is a precision grinding. FIG. 3 shows that the milling and grinding device 100 is in a third use state. In an alternative embodiment, the precision grinding may be omitted, or may be applied more than once. Grinding amounts of the fine grinding and the precision grinding are preset in the controller 54.

Step 106: the workpiece 200 is measured to determine whether a machining precision satisfies a required precision. The required precision is pre-stored in the controller 54. The controller 54 controls the spindle 30 to replace the grinding wheel 70 with the measuring probe 80 from the tool magazine 52, and controls the measuring probe 80 to insert into the pre-formed inner hole being ground. A size of the pre-formed inner hole being ground is measured by the measuring probe 80, and is fed back to the controller 54. The controller 54 determines whether the workpiece 200 is machined to satisfy the required precision. If the workpiece 200 does not reach the required precision, the milling and grinding device 100 repeats the Step 105 and Step 106 until the required precision is reached.

When the required precision of the workpiece 200 is low, the tool setting gauge 40 and the measuring probe 80 can be omitted. Then, the process of setting the position of the milling cutter 60 in the Step 102 can be omitted, and Step 103 and Step 106 can be omitted. After Step 105, the machining to the workpiece 200 is done or completed.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A milling and grinding device, for machining a workpiece, comprising:
   a rack defining a receiving chamber, the rack comprising a workstation at a bottom surface of the rack;
   a positioning tool mounted on the workstation to position the workpiece;
   a spindle mounted on the rack;
   a tool magazine mounted on the rack;
   a milling cutter received in the tool magazine, and capable of milling the workpiece to form a pre-formed inner hole;
   a grinding wheel received in the tool magazine, and capable of grinding the pre-formed inner hole of the workpiece to form an inner hole;
   a controller mounted on the rack, and capable of controlling the spindle to receive the milling cutter or the grinding wheel from the tool magazine, to mill or grind the workpiece; and
   a tool sharpening mechanism mounted on the workstation, and capable of sharpening the grinding wheel, to achieve different grinding precisions.

2. The milling and grinding device of claim 1, wherein the spindle comprises a mounting portion at a distal end thereof facing the workstation, each of the milling cutter and the grinding wheel comprises a positioning portion, the positioning portion of the milling cutter and the positioning portion of the grinding wheel match with the mounting portion, respectively, thus the milling cutter and the grinding wheel are capable of assembling with the spindle.

3. The milling and grinding device of claim 1 further comprising a tool setting gauge, wherein the tool setting gauge is mounted on the workstation, the tool setting gauge is capable of setting the milling cutter in a predetermined position before milling, or setting the grinding wheel in a predetermined position before grinding.

4. The milling and grinding device of claim 1 further comprising a measuring probe, wherein the measuring probe is received in the tool magazine, the measuring probe is capable of measuring the workpiece, and feeding back a measuring result to the controller, the controller is capable of calculating a grinding amount according to the measuring result of the measuring probe.

5. The milling and grinding device of claim 4, wherein the spindle comprises a mounting portion at a distal end thereof facing the positioning tool, the measuring probe comprises a positioning portion, the positioning portion of the measuring probe matches with the mounting portion, the measuring probe is capable of being mounted on the spindle.

6. The milling and grinding device of claim 1, wherein the positioning tool comprises a fixing portion located on the workstation and a plurality of clamping portions mounted on the fixing portion, the fixing portion defines a fixing hole along a center axis thereof, and radially defines a plurality of receiving grooves, respectively, the fixing portion is capable of receiving the workpiece, the plurality of clamping portions are received in the plurality of receiving grooves, respectively, the clamping portions are capable of clamping the workpiece received in the fixing portion, to position the workpiece.

7. The milling and grinding device of claim 1, wherein the positioning tool comprises a three-jaw chuck.

8. A machining method using the milling and grinding device of claim 1, comprising steps as follows:
positioning a workpiece on the positioning tool;
controlling the spindle to receive the milling cutter by using the controller, and milling the workpiece by the milling cutter;
controlling the spindle to replace the milling cutter with the grinding wheel from the tool magazine by using the controller, and grinding a pre-formed inner hole of the workpiece by the grinding wheel; and
moving, based on controls from the controller, the spindle to the tool sharpening mechanism to sharpen the grinding wheel, and then controlling the spindle to grind the pre-formed inner hole in a different grinding precision.

9. The method of claim 8, wherein the milling and grinding device further comprises a tool setting gauge mounted on the workstation, before the milling cutter milling the workpiece or the grinding wheel grinding the workpiece, the controller controls the spindle to move the milling cutter or the grinding cutter to the tool setting gauge, and the tool setting gauge places the milling cutter or the grinding cutter in a predetermined position.

10. The method of claim 8, after the milling cutter milling the workpiece, further comprising steps as follow:
controlling the spindle to replace a measuring probe from the tool magazine by using the controller;
measuring a size of the pre-formed inner hole by using the measuring probe; and
feeding back a measuring result to the controller, wherein the controller controls a grinding amount of the grinding wheel according to the measuring result.

11. The method of claim 10, wherein after the grinding wheel grinding the workpiece, the method further comprising steps as follow:
controlling the spindle to replace the measuring probe from the tool magazine, and controlling the measuring probe to measure the workpiece by using the controller;
feeding back a measuring result from the measuring probe to the controller;
judging and determining, based on controls from the controller, whether a machining precision satisfies a required precision according to the measuring result; and
repeatedly sharpening the grinding wheel and grinding the workpiece until the workpiece reaching the required precision if the workpiece has not yet reached the required precision.

12. The method of claim 11, wherein the required precision is pre-stored in the controller.

* * * * *